United States Patent [19]

Cox

[11] 4,429,205
[45] Jan. 31, 1984

[54] INDUCTION HEATING APPARATUS

[75] Inventor: Karmen D. Cox, Lafayette, Ind.

[73] Assignee: Roper Corporation, Kankakee, Ill.

[21] Appl. No.: 348,349

[22] Filed: Feb. 12, 1982

Related U.S. Application Data

[63] Continuation of Ser. No. 116,300, Jan. 28, 1980, abandoned.

[51] Int. Cl.$^3$ .......................... H05B 6/06; H05B 6/12
[52] U.S. Cl. .......................... 219/10.77; 219/10.49 R;
363/96; 363/135; 307/252 M; 307/252 T;
323/289
[58] Field of Search ...................... 219/10.77, 10.49 R,
219/10.75; 363/87, 92, 95, 96, 54, 57, 58, 128,
135, 136; 307/252 L, 252 M, 252 T, 252 W;
323/24, 225 C, 289

[56] References Cited

U.S. PATENT DOCUMENTS

| 3,449,623 | 6/1969 | Dietz . |
| 3,452,244 | 6/1969 | Dietz . |
| 3,458,800 | 7/1969 | Bross ................................ 363/128 |
| 3,551,778 | 12/1970 | Ekstrom . |
| 3,553,567 | 1/1971 | Pesce et al. . |
| 3,622,806 | 11/1971 | Williams ............................ 307/252 |
| 3,710,062 | 1/1973 | Peters, Jr. ..................... 219/10.77 X |
| 3,740,474 | 6/1973 | Dietz . |
| 3,775,577 | 11/1973 | Peters, Jr. ..................... 219/10.49 R |
| 3,781,505 | 12/1973 | Steigerwald ................. 219/10.49 R |
| 3,855,518 | 12/1974 | Genuit . |
| 3,886,342 | 5/1975 | Peters, Jr. ..................... 219/10.49 R |
| 3,898,410 | 8/1975 | Peters, Jr. ......................... 219/10.49 |
| 3,919,621 | 11/1975 | Wechsler ..................... 219/10.77 X |
| 3,942,094 | 3/1976 | Akamatsu . |
| 4,002,929 | 1/1977 | Suemasa et al. ............ 323/225 C X |
| 4,010,342 | 3/1977 | Austin .......................... 219/10.77 X |
| 4,016,391 | 4/1977 | Kiuchi et al. .................... 219/10.49 |
| 4,016,392 | 4/1977 | Kobayashi et al. ........... 219/10.49 R |
| 4,058,696 | 11/1977 | Antier et al. ...................... 219/10.77 |
| 4,065,802 | 12/1977 | Mizukawa et al. ........... 219/10.77 X |
| 4,085,300 | 4/1978 | Mackenzie et al. .......... 219/10.49 R |
| 4,107,551 | 8/1978 | Akamatsu ........................... 307/252 |
| 4,112,286 | 9/1978 | Alderman et al. ............... 219/10.77 |

FOREIGN PATENT DOCUMENTS 54-137146 10/1979 Japan ............................... 219/10.77

Primary Examiner—Roy N. Envall, Jr.
Assistant Examiner—Philip H. Leung
Attorney, Agent, or Firm—Leydig, Voit, Osann, Mayer & Holt, Ltd.

[57] ABSTRACT

An induction heating apparatus which includes an induction coil with an associated load and a resonant inverter circuit coupled to a DC power supply for energizing the heating coil. The inverter circuit includes a gate controlled thyristor which is cyclically gated to produce a conductive first period followed by an nonconductive second period in order to energize the heating coil. A diode of opposite polarity to the gate controlled thyristor is coupled in parallel therewith and has an impedance connected in series. The voltage across this series impedance is coupled to the gate of the gate controlled thyristor. The inverter circuit additionally includes an improper load check circuit for disabling the gating of the thyristor in the event of an improper load coupled to the heating coil, and a gate triggered timing generator for adjusting the timing of production of thyristor gate pulses to maintain substantially constant power to proper heating coil loads.

30 Claims, 9 Drawing Figures

INDUCTION HEATING APPARATUS

This is a continuation of application Ser. No. 116,300, filed Jan. 28, 1980, now abandoned.

This invention relates generally to induction heating apparatus and more particularly concerns control and protection circuitry for induction heating apparatus such as cooking appliances.

Inverter circuits using gate controlled thyristors have been employed to energize an inductively coupled load in induction heating appliances, such as those appliances used for induction cooking. Among the primary design concerns in such induction cooking inverter circuits are the need to control the voltages and currents of the active devices in the circuit, the need to control the amount of power delivered to a pan load dependent upon the pan size and material, and the related requirement to maximize the power delivery levels which may be accommodated by the active devices in the circuit.

It is consequently an object of the present invention to automatically adjust the level of power delivered to an inductively coupled load by an inverter circuit so that the delivered power is more or less independent of moderate variations in the magnetic properties of the metal constituting the load and depends primarily upon a power control setting.

It is a further object of the present invention to automatically check the operating conditions of the inverter circuit which is delivering controlled power to the inductively coupled load in order to render the inverter circuit inoperative for load conditions in excess of set points which might produce overheating or excess currents or voltages or rates of rise of each beyond the limits of the active devices in the circuit.

It is a still further object of the present invention to provide an operating condition check circuit that is independent of the inverter input voltage amplitude so that the load checks can be performed at substantially any point in the operating cycle of a power supply whose voltage is varying with the amplitude of an AC voltage input.

It is another related object of the invention to provide, in an inverter circuit employing an SCR, an enhanced negative bias on the anode-to-cathode and gate-to-cathode junctions of the SCR after it stops conducting in order to speed its recovery to full stand off voltage capability.

Other objects and advantages of the invention will become apparent upon reading the following detailed description and upon reference to the drawings, in which.

Figure 1:
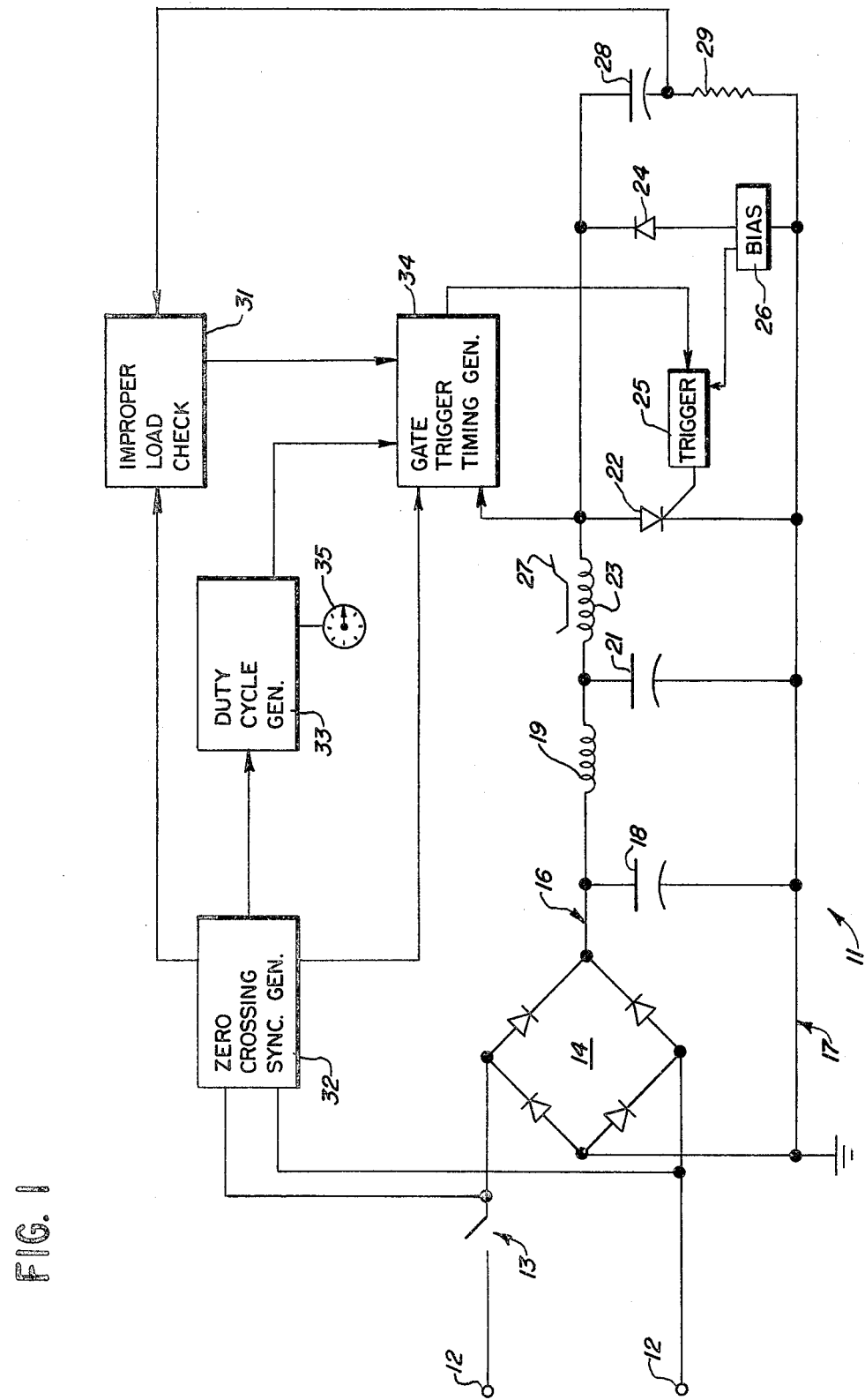
FIG. 1 is a schematic diagram, partially in block diagram form, of an inverter circuit according to an embodiment of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention, as defined by the appended claims.

Referring now to FIG. 1, an inverter circuit 11, with related control circuits, for induction cooking, partially in block diagram form, is shown. In operation, a 60 hz AC power source voltage is applied to the circuit 11 at input terminals 12. When power switch 13 is closed, this 60 hz voltage is applied to a full wave bridge rectifier 14 to produce a DC voltage between the bridge output nodes 16 and 17. Line 16 is positive relative to line 17, which is a ground reference for the circuit 11.

This DC voltage is applied to the loaded inverter circuit through a low pass filter consisting of a filter capacitor 18 and a filter inductor 19. Current flow through the filter inductor 19 charges a commutating capacitor 21 such that its terminal connected to the inductor 19 is charged to a positive voltage relative to the low side 17 of the bridge rectifier 14. The voltage output of the bridge rectifier 14 across the filter capacitor 18 is full wave rectified, at a repetition rate of 120 hz, but substantially unregulated so that under full load conditions the filter capacitor 18 voltage varies between approximately zero and the peak line voltage impressed across the terminals 12. For a 120 volt line voltage, the peak voltage on the capacitor 18 would be approximately 170 volts.

At a time selected as shall be described hereinafter, an SCR 22 is switched on by an external trigger and provides a low resistance conductive path from the right hand terminal of a work coil 23 to the low side of the bridge rectifier output, node 17. Current thereupon flows from the commutating capacitor 21 through the work coil 23 with a nearly sinusoidal wave form whose period is determined primarily by the resonant frequency of the inductance of the work coil 23 loaded by the vessel 27 and the capacitance of the commutating capacitor 21. After one half cycle of the sinusoidal oscillation, the current through the work coil 23 reverses, which causes the SCR 22 to switch to a nonconductive state. The reverse current through the work coil 23 is then conducted by a diode 24 and a biasing network 26.

According to one aspect of the invention, the current flowing through the diode 24 also flows through the biasing network 26 producing a voltage drop which causes the voltage from the cathode of the diode 24 to the node 17 to be negative. This negative voltage (e1 in FIG. 2a) appears across the terminals of the SCR 22, which is now in a nonconducting state and is recovering from the heavy forward conduction that has just occurred. If forward voltage is applied to the SCR before it has recovered its full stand off voltage capability, it will begin conduction without application of a trigger to its gate, thus destroying the controlled operation necessary for proper performance of the circuit.

The recovery process for the SCR 22 is accelerated by applying a reverse bias to the SCR during the recovery interval principally established by the biasing network 26. The actual SCR anode bias is produced by the sum of the voltage drops across the bias network 26 and the diode 24. The bias network 26 further provides a negative bias to the gate of the SCR 22 by way of a gate trigger circuit 25. The negative gate bias for the SCR 22 enables the SCR to withstand a higher rate of rise of reapplied voltage. Incorporation of the SCR anode bias substantially reduces the recovery time of the SCR and thereby permits the circuit to operate at a higher frequency and higher power level than would otherwise be possible.

Upon the completion of the negative half cycle of oscillation, the current in the resonant circuit attempts to reverse, but the SCR 22 is now in a nonconducting condition and the diode 24 is unable to conduct in the reverse direction, so the current in the work coil 23 stops flowing. At this time, the commutating capacitor 21 has a stored charge corresponding to the energy not absorbed by the load during the cycle of operation just completed. The load is coupled inductively to the work coil and is shown diagrammatically as a pan 27. As a result of the loss of the conduction paths through the SCR 22 and the diode 24, there can be no change in current through the work coil 23, and the voltage drop across the work coil is therefore zero. This causes the voltage at the right hand terminal of the work coil 23, which is also the SCR anode voltage, to jump to the same value as the upper terminal of the commutating capacitor 21.

In order to prevent the rate of change of voltage across the SCR 22 from exceeding safe limits, a snubber capacitor 28 and a snubber resistor 29 are connected across the SCR. The snubber resistor 29 must be small enough in value to permit the snubber capacitor to adequately limit the rate of change of voltage across the SCR 22 when current flow through the work coil 23 is interrupted and the diode 24 ceases to conduct; but the snubber resistor must also be large enough to prevent the transfer of excessive energy from the capacitor 28 through the SCR when the SCR is turned on.

An idealized typical voltage wave form of the voltage across the SCR 22 is shown in FIG. 2a. At the time t1 the diode 24 stops conducting and the voltage across the SCR 22 jumps from a negative value e1, determined by the biasing network 26 and the drop across the diode 24 to a positive voltage e2 determined by the voltage across the commutating capacitor 21.

During the time T2 the SCR 22 and the diode 24 are nonconducting and the commutating capacitor 21 recharges through the filter inductance 19. The difference in voltage level between e2 and e3 is a measure of the amount of energy inductively coupled to the load 27 by the work coil 23. The greater the ratio of e3 to e2, the more heavily loaded is the circuit. If the circuit is improperly loaded such as, for example, when the load 27 is removed, the ratio of e3 to e2 approaches unity. Damage to the circuit components can result if the inverter is operated with an improperly coupled load because the SCR voltage can exceed its maximum allowable safe operating limits. It should be noted also that if the snubber resistor 29 is not sufficiently large, transient oscillations may result from the series combination of the commutating capacitor 21, the work coil 23 and the snubber capacitor 28, which can produce even greater voltages across the SCR.

Improper loading of the inverter circuit generally results from the pan load 27 being less than a reference value or level, which results in a higher e2 voltage (FIG. 2a) and a higher rate of rise of voltage from e1 to e2. Further, the nonidealized e2 voltage in an unloaded condition may actually overshoot momentarily beyond even the e3 voltage level dependant upon the action of the snubber network across the SCR.

One previous approach to detecting an improper load condition utilizes a comparison circuit which determines the difference in voltage levels between e3 and e2. In this prior art circuit, e3 is distinguished from e2 by filtering based upon the difference in slope between the e1 to e2 transition and a representation of the peak voltage e3, the former being detected by a circuit of a higher frequency response than the latter. In this prior art circuit, when e2 equals or exceeds e3, the inverter circuit is disabled for a predetermined time and then the test is repeated. This approach has two drawbacks. First, its sensitivity varies with the amplitude of the DC voltage applied to the inverter, since the difference voltage e3 minus e2 is directly proportional to the supply voltage as well as to the work coil loading. Second, in practice, the snubber resistance 29 must frequently be made small enough to permit overshoots of voltage to occur during the transition from e1 to e2 in order to increase the circuit sensitivity to underloading. This change from the ideal snubber resistance value is a potential source of damage to the SCR from overvoltage and from high surge currents when the SCR is turned on.

Figure 2:
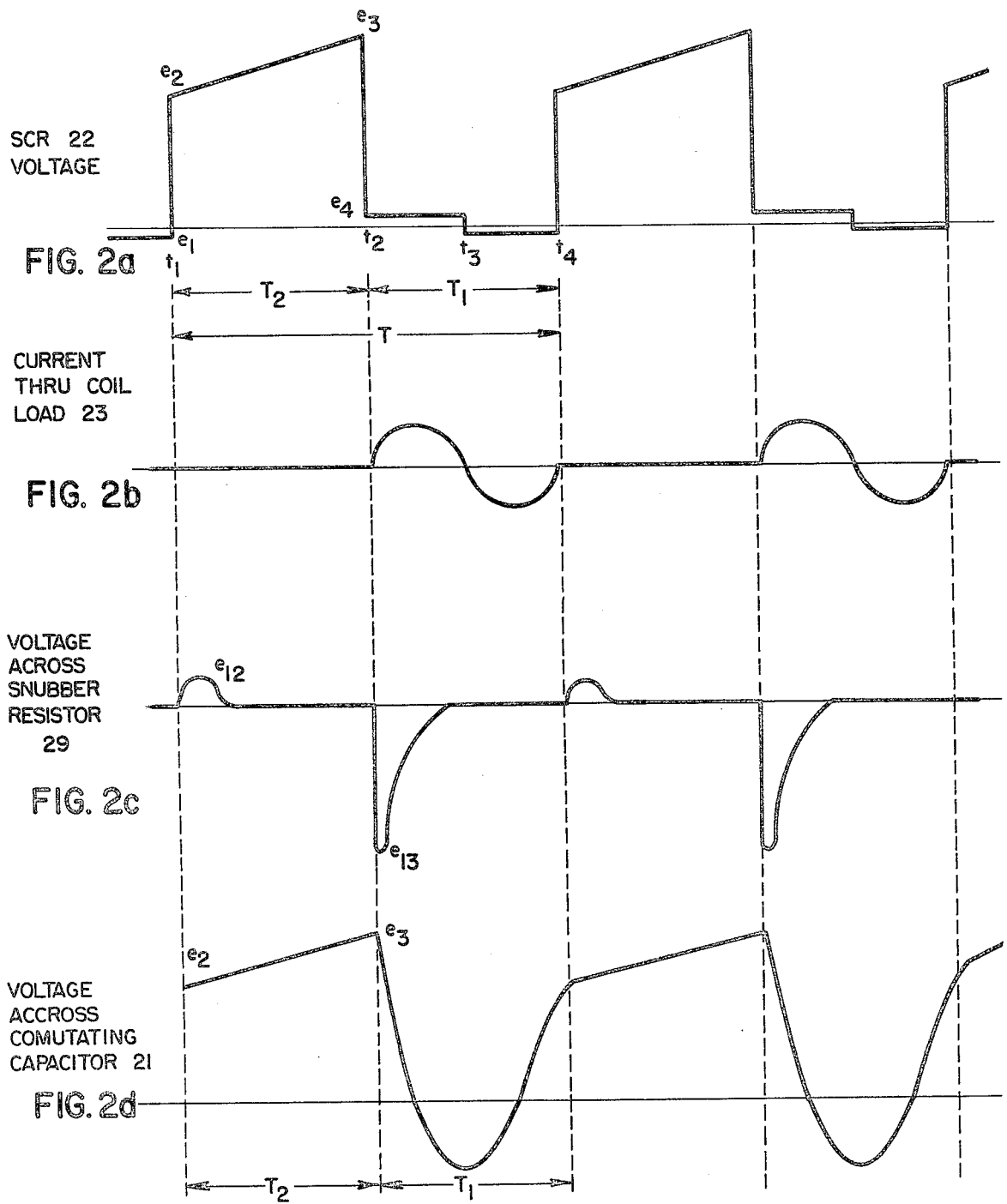
FIGS. 2a, 2b, 2c and 2d illustrate a series of wave forms on a common time scale taken at various points in the circuit of FIG. 1.
Figure 3:
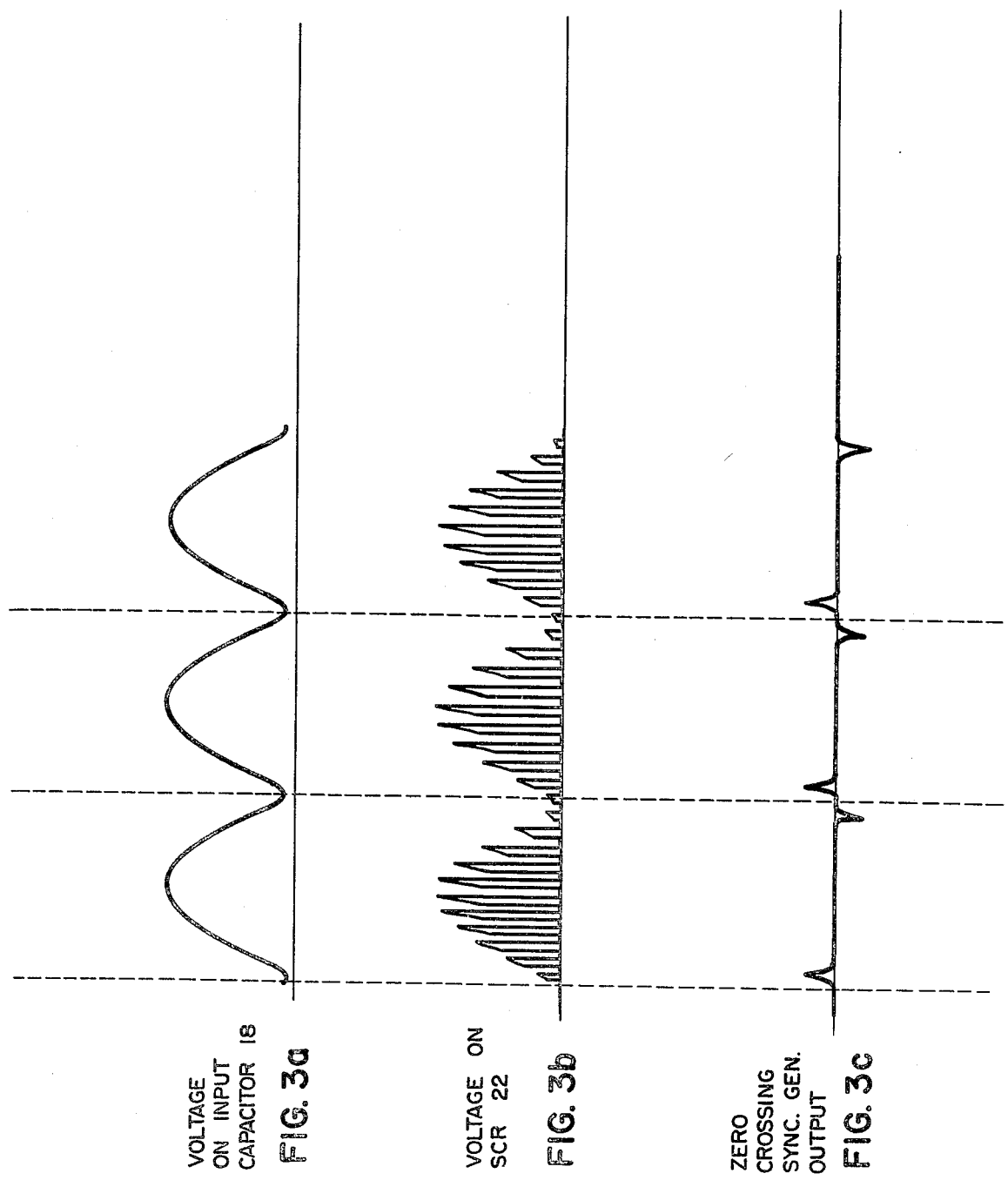
FIGS. 3a, 3b and 3c illustrate a series of wave forms on a different time scale, synchronized to the frequency of power supply variations, taken at points in the circuit of FIG. 1.

The above mentioned variation of both e2 and e3 with the supply voltage is illustrated in FIG. 3. The voltage on the input capacitor 18 is shown in FIG. 3a and varies as previously indicated from near zero to approximately 170 volts at a 120 hertz rate. In FIG. 3b the SCR voltage of FIG. 2a is shown schematically on the power supply 120 hertz rate time scale. It can be seen that both the e2 and e3 voltages vary considerably over each cycle of the power supply at the 120 hertz rate. For a nominal inverter circuit frequency of 20 kilohertz, the actual number of inverter cycles in one power supply cycle would be approximately 170 rather than the mere 10 or so which are depicted in FIG. 3 for illustrative purposes. Typically, the SCR voltage amplitude is two or three times that of the input capacitor voltage throughout each cycle.

In order to overcome the shortcomings of prior art circuits, and according to another aspect of the invention, an improved improper load check circuit 31 substantially takes the ratio of e3 to e2 rather than their difference. This ratio is substantially unaffected by the supply voltage level and the improper load check can therefore be conducted continuously during the 120 hertz variations in the DC supply bridge 14 output. In implementing such a circuit, advantage is taken of the fact that the e1 to e2 voltage slope is of opposite polarity to the e3 to e4 slope. Of the voltages and currents in the inverter circuit which are related to e2 and e3 and distinguishable on this basis of slope polarities, in the illustrated embodiment the input used for the improper load check circuit 31 is the voltage across the snubber resistor 29. The voltage across this resistor results from the charge and discharge of the snubber capacitor 28 which occurs beginning at times t1 and t2, respectively, as shown in FIG. 2c. The amplitudes of the voltage pulses in this wave form are proportional to the amplitudes of the voltages e2 minus e1 and e4 minus e3. These voltages are closely approximated merely by e2 and minus e3, respectively, since e1 and e4 are relatively small. As shall be described further hereinafter, the improper load check circuit 31 takes an appropriately weighted ratio of the snubber resistor 29 voltages e13 and e12, to produce an output signal in the event of an improper load which disables the SCR gate trigger circuit 25. As shall also be described in more detail hereinafter, the improper load check circuit 31, upon detecting an improper load and stopping SCR gate triggering, after a predetermined time rechecks for proper loading.

In the present instance improper loading primarily refers to metallic loads which do not provide sufficient effective resistance to the work coil 23. A practical selection of proper metallic pan loads ranges from lower inductance, higher resistance stainless steel to higher inductance, lower resistance cast iron. An improper pan load, where the above range is proper, is a lower loss aluminum pan.

A zero crossing sync generator 32 produces a negative pulse slightly before the minimum value of the voltage on the filter capacitor 18 and a positive pulse slightly after this minimum value. The zero crossing sync generator 32 is connected to the incoming AC power source, before rectification of the AC voltage, and therefore produces these pulses before and after zero crossings of the sinusoidal AC input waveform. The negative going zero crossing sync generator pulse is used to initiate a proper load recheck by the circuit 31 so that the check is performed when voltages are low so that the SCR 22 and other active devices are not improperly stressed in the event that a proper load is not present. Such zero crossing sync pulse generator circuits are known, and therefore the circuit 32 will not be described in detail.

In the illustrated embodiment, circuit operation is interrupted not only as a result of improper load detection but also by a duty cycle generator 33. A nominal setting on a control 35 of the amount of power to be delivered to a load 27 determines the percentage of on-time for the inverter circuit. Typically the duty cycle generator 33 will allow gating pulses to the SCR 22 for a period of several hundred milliseconds during each second. This results in the inverter circuit operating over, for example, approximately forty of the input voltage wave form cycles as shown in FIG. 3.

According to a further aspect of the invention the power delivered to the load 27 is automatically adjusted to maintain the power substantially constant for a given setting at the control 35 of the duty cycle generator 33. This automatic adjustment of power delivered to the load compensates for moderate variations in magnetic properties of the load employed. Without such automatic control incorporated in an induction cooking unit circuit, the power delivered to different utensil materials may vary by as much as 50 percent for the same power control setting.

The gate trigger timing generator 34 in the illustrated embodiment serves to vary the amount of power delivered to ferromagnetic or other proper loads of varying material or size for the given power setting at the duty cycle generator 33. Low inductance pan loads such as pans of aluminum or copper, or no load whatsoever, are detected by the improper load check circuit 31. For proper loads, generally ferromagnetic loads, the pan types vary from lower inductance, higher loss stainless steel to higher inductance, lower loss cast or forged iron, and these proper loads receive controlled power due to the gate trigger timing generator 34.

The operation of the gate trigger timing generator 34 may be better illustrated with reference to FIG. 2. FIG. 2a shows the voltage wave form across the SCR 22 of the inverter. The time T, which equals T1 and T2, is the period of one complete cycle of the inverter operation, which is typically at a 20 kilohertz rate, and is determined by the time period of the trigger generator plus the resonant time period. The time T1 corresponds to one period of the resonant circuit made up of the commutating capacitor 21 and the inductance of the load coil 23 and typically corresponds to a frequency in the order of 40 kilohertz. The time T2 is the difference between the total period T and the period T1 of the resonant circuit. When the load is changed it alters the inductance of the work coil 23 which in turn alters the period T1.

For a fixed T, an increase or decrease of T1 causes an increase or decrease of power to the pan load, respectively. The predominant influence on T1 is the effective inductance of the load coil as affected by the pan load 27 (FIG. 1). For an inductance increase of the load coil, T1 increases; and for an inductance decrease, T1 decreases. Over the range of proper metallic pan materials allowed by the pan check circuit 31, lower inductance pans such as those of stainless steel have apparent higher losses, while higher inductance pans such as those of cast iron have lower losses.

For a fixed T2, an increase of T1 produced by a pan of lower losses causes an increase in T, and the effect is a decrease of power to the pan load. Similarly, for a fixed T2, a decrease of T1 produced by a pan of higher losses causes a decrease in T, and the effect is an increase of power to the pan load. If T2 is increased when T1 increases, and decreased when T1 decreases, as is done in some protection circuits, the inverse relationship between the changes in T1 and the amount of power to the pan load is more pronounced.

In order to maintain substantially constant power for heating pan loads of interest, substantially constant pan power is provided by appropriately changing T2 to compensate for a change in T1. The relationship between T2 and T1 required to maintain the power constant can be closely approximated in the vicinity of the normal operating point by a linear relationship of the form $$T2 = aT1 + b \tag{1}$$

Typical values for a and b are $a = -0.4$ and $b = 37.5$ microseconds, giving a relationship between T1 and T2 of $$T2 = -0.4T1 + 37.5 \tag{2}$$

where both T1 and T2 are measured in microseconds. As a result, in order to keep the power dissipated in the load constant, it is necessary to decrease T2 when T1 increases and to increase T2 when T1 decreases. This is performed by the circuitry in the gate trigger timing generator 34.

Figure 4:
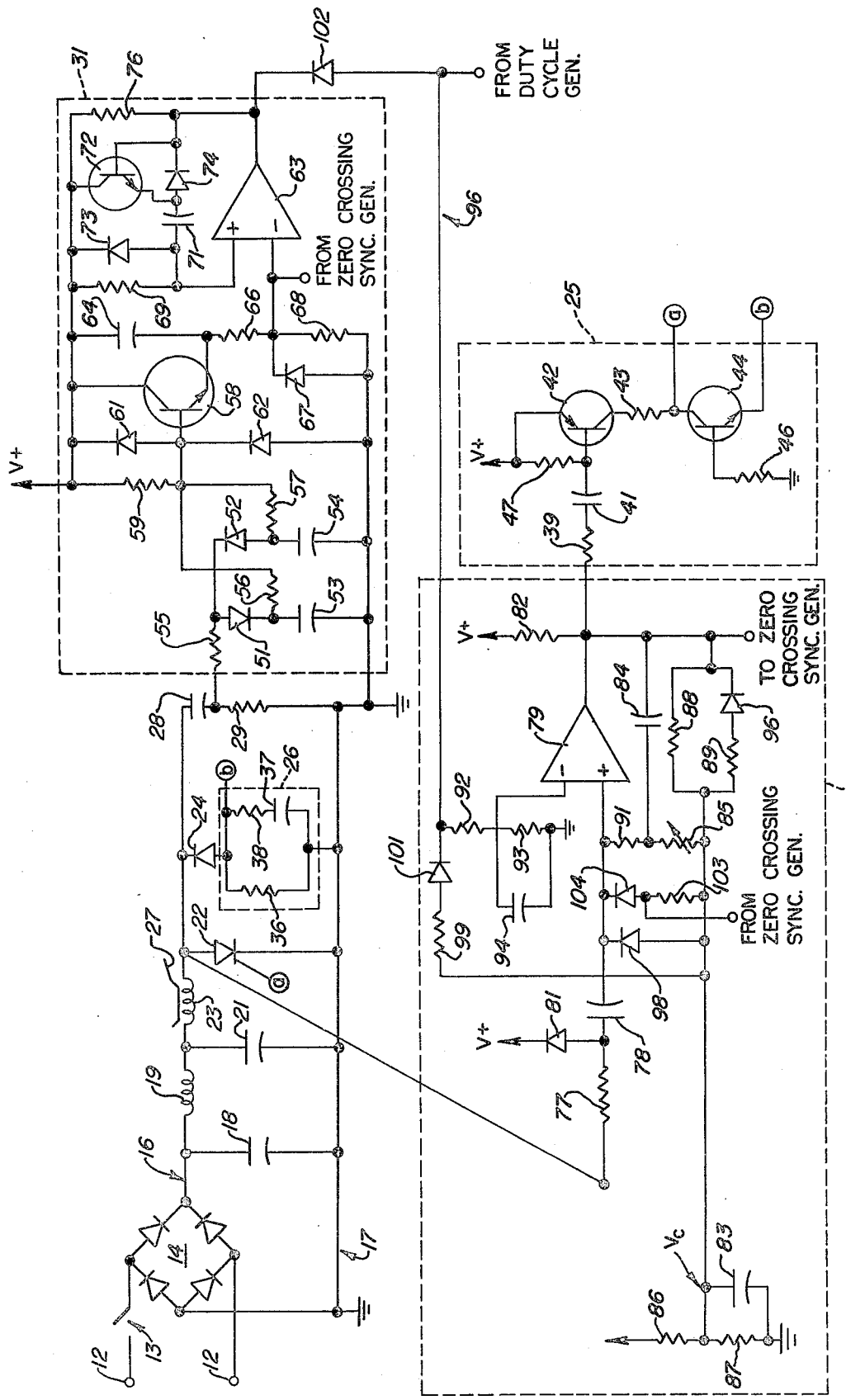
FIG. 4 is a more detailed schematic diagram of the inverter circuit of FIG. 1.

A more detailed schematic diagram of the inverter circuit 11 is shown in FIG. 4. In FIG. 4 the SCR reverse bias circuit 26 comprises a resistor 36 in series with the return diode 24 and a series combination of a resistor 38 and a capacitor 37 connected in parallel with the resistor 36. The SCR anode reverse bias is produced by the sum of the voltage drops across the resistor 36 and the diode 24. The capacitor 37 and resistor 38 in combination with further trigger circuitry provide a negative bias to the gate of the SCR which enables the SCR to withstand a higher rate of change of reapplied voltage.

After the return diode 24 has ceased to conduct at the end of the period T1, the negative voltage at the anode of the diode is maintained by the capacitor 37. This negative voltage at the anode of the diode 24 is coupled to the gate of the SCR through the gate trigger circuit 25. Therefore, there is a negative bias on the SCR gate at the time t1 when voltage is reapplied, helping to prevent undesired conduction of the SCR 22 due to the rate of rise of voltage from e1 to e2.

The negative gate bias from the bias circuit 26 is coupled to the SCR gate by way of a gate trigger circuit 25 which operates as follows. In the trigger circuit 25 a negative pulse is coupled through a resistor 39 and a capacitor 41 to the base of a transistor 42. The base of the transistor 42 is normally held positive through a resistor 47 connected to V+. The negative pulse turns on the transistor 42 coupling the V+ supply through a current limiting resistor 43 to the gate of the SCR 22, turning on the SCR. The end of the resistor 43 not connected to the transistor 42 is connected as indicated at "a" to the gate of the SCR 22.

In order to provide the negative bias to the gate of the SCR 22, the anode of the diode 24 is coupled through a transistor 44, by way of the connection indicated at "b", to the gate of the SCR 22. A resistor 46 references the base of the transistor 44 to ground so that for the duration of the negative voltage held on the anode of the diode 24 by the capacitor 37, this negative bias is coupled through the transistor 44 to the collector of the transistor and hence to the gate of the SCR 22.

A specific preferred embodiment of the improper load check circuit 31 is shown in FIG. 4. As in FIG. 1, the improper load check circuit 31 is coupled to the junction between the snubber resistor 29 and the snubber capacitor 28. The voltage at this point, the voltage across the snubber resistor 29, is shown in FIG. 2c. The snubber resistor voltage is coupled through a resistor 55 and two diodes 51 and 52 to two capacitors 53 and 54, respectively. The capacitor 53 charges up to the peak value e12 of the positive voltage across the snubber resistor 29. Likewise, the capacitor 54 charges up to the negative peak value e13 of the voltage across the snubber resistor. The amplitudes of the voltages e12 and e13 are directly related to the amplitudes of the voltages e2 and e3 across the SCR.

A threshold sensing circuit is comprised of an emitter-follower transistor 58, voltage divider resistors 66 and 68, and a comparator 63. The voltage developed on the base of the transistor 58 is due to currents produced in resistors 56 and 57 which are proportional to the voltages on capacitors 53 and 54. These voltages are relatively large and of opposite polarity, such that they provide large changes on the base of the transistor 58. Resistor 59 offsets the bias produced by the resistors 56 and 57 on the transistor 58 base closer to the threshold voltage of the comparator. Since the offset of the threshold is negligible, the system functions as if it is a voltage polarity sensing circuit. Two diodes 61 and 62 are connected between V+ and ground with their junction point tied to the base of the transistor 58 to maintain voltage swings at this point between the supply voltage and the circuit ground.

With appropriate biasing provided by the resistor 59 the transistor 58 is turned on in the condition that $$e12/e13 \geq R56/R57 \qquad (3)$$

Therefore, by properly selecting the resistors 56 and 57, the switching condition for the threshold sensing circuit can be made to occur for any desired ratio of e13 to e12. Since the switching is a function of the ratio of the voltages, it is independent of their actual magnitudes and the circuit can function for low DC supply voltage conditions as well as for high supply voltage conditions.

To turn off the SCR, a positive voltage is coupled to the inverting input of the comparator 63, which in turn generates an output signal that disables the SCR gate trigger generation by the timing generator circuit 34. Therefore, no trigger pulses are produced to activate the inverter circuit, and the inverter action is thereby stopped. The emitter of the transistor 58 is coupled through a voltage dividing network consisting of the resistors 66 and 68 to the inverting input of the comparator 63. A diode 67 clips negative transients from the voltage at the inverting input of the comparator 63. A capacitor 64 bypasses the transistor 58 to couple a turn-on, power-up reset pulse to the comparator 63 from the V+ supply line to disable triggering when the system is first turned on.

In operation, a positive voltage coupled to the inverting input of the comparator 63 is insufficient of itself to cause the comparator to disable the trigger pulses. The voltage in FIG. 3c from the zero crossing sync generator 32 (FIG. 1) is also coupled to the inverting input of the comparator 63 and the concurrence of a positive pulse from the zero crossing sync generator and a high output from the emitter of the transistor 58 causes the output of the comparator 63 to go low, disabling the trigger pulses to the SCR 22.

In order to periodically recheck the pan load to see if it is now proper, a feedback timing circuit is connected between the output of the comparator 63 and its noninverting input. In the feedback network a resistor 69 and a capacitor 71 set the timing for the pan load recheck operation. Immediately upon the output of the comparator 63 going low and disabling the trigger circuitry for the SCR, the right side of the capacitor 71 goes from approximately V+ to approximately zero and the left side of the capacitor goes negative. Therefore, the left side of the capacitor 71 must recharge to V+ through the resistor 69 to return the noninverting input of the comparator 63 sufficiently positive that the output of the comparator could again go high. During nonoperation of the inverter circuit, there are no voltages generated across the snubber resistor 29, and the inverting input of the comparator 63 is maintained at a positive voltage level by the transistor 58 through the application of a positive voltage at the transistor base from V+ through the resistor 59. The divider path to provide this base voltage is through resistor 59, resistor 57, diode 52, resistor 55, and resistor 29.

Once the capacitor 71 has recharged sufficiently to bring the noninverting comparator input positive, a negative going pulse from the zero crossing sync generator applied to the inverting input of the comparator 63 will permit the output of the comparator to return high. The output of the comparator 63 then goes high permitting a series of trigger pulses to activate the inverter circuit beginning near the low point of the DC voltage supply to avoid stress on the inverter components. When the output of the comparator 63 goes high, a transistor 72 is turned on and the capacitor 71 quickly discharges through the transistor 72 and a diode 73. A diode 74, which provides the feedback path for the capacitor 71 and the resistor 69 when initiating an improper load condition, is now reversed biased when the output of the comparator 63 returns positive for a pan load recheck. A biasing resistor 76 is connected from the V+ supply to the base of the transistor 72.

After the output of the comparator 63 has gone high and the capacitor 71 has been quickly discharged, the noninverting input of the comparator 63 will remain high as long as the comparator output remains high. As the inverter begins operation again, if a proper load is now present, then the bias on the transistor 58 will go low and the output of the comparator 63 will remain high. Should the improper load condition persist, the output of the comparator 63 will once again go low disabling the triggering of the SCR and the inverter circuit.

In the particular circuit described, the voltages e13 and e12 are compared to check pan loading because they are related to the SCR voltages e3 and e2, respectively. Just as the relationship between e3 and e2 is indicative of the change in stored energy in the circuit from the beginning of T1 to the end of T1, other pairs of signals may be selected which have an analogous relationship. Such signal pairs may be voltages or currents, the signals of a pair of signals being conveniently of opposite polarity and sampled at one location in the circuit. In a pair of said signals, the first would represent energy at an earlier time in T1, and the second would represent energy at a later time in T1. The energy change between the two signals is then compared to a reference value to check for proper pan loading.

Also shown in FIG. 4 is circuitry embodying the gate trigger timing generator 34 of FIG. 1. The input to the trigger timing generator 34 is the voltage wave form across the SCR 22, which is shown in FIG. 2a. This SCR voltage is coupled through a resistor 77 and a capacitor 78 which creates a positive input pulse wave form to the non-inverting input of a voltage comparator 79. The voltage coupled through the resistor 77 is clipped at the V+ supply voltage level by a diode 81.

During normal operation, a steady-state condition is reached in which the gate trigger timing generator circuit operates as follows. The output of the comparator 79 is switched high at the beginning of T2, the time at which the diode 24 ceases to conduct causing the jump in voltage from e1 to e2 as shown in FIG. 2a. The comparator 79 output is driven high by the application of the input through the resistor 77 and the capacitor 78 to the noninverting input of the comparator. With the output of the comparator 79 high, the voltage drop across a load resistor 82 goes from the full V+ supply voltage to zero and the voltage at the output of the comparator jumps from substantially zero to the full V+ supply voltage.

Just prior to this switching action of the comparator 79, two capacitors 83 and 84 have charged to the same voltage level, which is determined by the voltage divider action of the bias network of two resistors 86 and 87 and the resistors 88 and 89 which are coupled to the output of the comparator 79. The capacitor 83 is large relative to the capacitor 84 and consequently its voltage is less varying. The capacitor voltage Vc is approximately one fourth of the supply voltage V+.

Immediately after the output of the comparator 79 has been switched high, the voltage on the right hand side of the capacitor 84 jumps from zero to V+, giving a total of Vc plus V+ for the voltage from the left side of the capacitor 84 to ground. Since the noninverting input of the comparator 79 is connected to the left side of the capacitor 84 through a resistor 91, the comparator output is held high even after the input pulse wave form is removed due to the short time constant of the input coupling circuit determined by the capacitor 78.

After the comparator output goes high, the capacitor 84 immediately begins discharging in such a manner as to cause the left hand side of the capacitor 84 to go from Vc plus V+ toward the Vc level on the capacitor 83.

A reference voltage of about one half of V+ is maintained on the inverting input of the comparator 79 by a voltage divider comprising a resistor 92 and a resistor 93 from the line 96. A filter capacitor 94 is connected in parallel with the resistor 93. As long as the improper load check circuit 31 output remains high, indicating a proper load, the line 96 will remain high at approximately V+.

When the voltage on the left side of the capacitor 84, which discharges through resistor 85, falls to approximately one half of V+, the reference voltage on the inverting input of the comparator, the comparator output returns low causing an immediate drop in the output voltage of the comparator to approximately zero. When the output of the comparator goes low, this low is coupled to the trigger circuit 25 as discussed previously to produce a trigger pulse for the SCR, terminating period T2.

When the output of the comparator 79 goes low, the right side of the capacitor 84 goes to zero causing the left side of the capacitor to go to one half of V+ minus V+, or minus one half of V+. The capacitor 84 now begins charging in such a manner as to cause the left side of the capacitor to go from minus one half of V+ toward Vc which is the bias level on the capacitor 83. No additional triggering of the comparator 79 can occur during this charging time since the Vc voltage is below the one half of V+ voltage on the inverting input of the comparator. However, after charging of the capacitor 84, this circuit is now ready to be triggered by a positive step input corresponding to completion of the next power cycle of the work coil 23, the SCR 22 and the diode 24.

In actual operation, the bias voltage level on the capacitor 83 is not constant but is determined by the charging of the capacitor through the resistor 88 when the comparator 79 output is high and the discharging of the capacitor 83 through the resistors 88 and 89 when the comparator output is low. The capacitor 83 has only a discharge path through the resistor 89 and not a charging path since a diode 96 is connected in series with resistor 89. Also, the divider network of the resistors 86 and 87 sets a nominal bias level corresponding to the fixed term b in the equation (1), which is repeated here for reference;

$$T2 = aT1 + b \quad (1)$$

Correct compensation is obtained by adjusting the bias of the capacitor 83 by proper selection of the resistors 86, 87, 88 and 89 so as to closely approximate the relationship between T1 and T2 given by equation (2).

If the load coil conduction time T1 increases, due to an increase in the effective inductance of the work coil 23, then during T1 the capacitor 83 will discharge to a lower value and the capacitor 84 will discharge such that the left side of the capacitor reaches this lower value. Therefore, when T1 ends and the output of the comparator 79 again goes high, the voltage differential across the capacitor 84 will be smaller and consequently the voltage on the left side of the capacitor 84 will be smaller. That means that the voltage on the left side of the capacitor 84 will fall to the one half V+ level in less time and that T2 will be decreased. This reduction in T2 corresponds to the "a" term in equation (1), which is negative, and provides an increase in the period (T) of the inverter cycle to maintain the average pan power constant.

If the time T1 is shortened, due to a decrease in the effective inductance of the work coil 23, the voltage level on the capacitor 83 will be increased due to the increase in T1 discharge time. This in turn will cause an increase in the voltage on the left side of the capacitor 84 when the comparator switches its output high. The time required for the voltage at the left side of the capacitor 84 to fall to the one half V+ level will be increased, which will increase T2, thereby decreasing the period (T) of the inverter power cycle and again keeping the average power constant.

It will be recalled that the metallic pan materials which are treated as proper loads range from lower inductance higher loss stainless steel to higher inductance lower loss cast iron. Therefore, for stainless steel pans, a lower inductance requires lower inverter circuit energy levels since there are higher losses in the pan. Similarly, for higher inductance cast iron pan materials, more circuit energy is needed since cast iron has lower losses. These requirements are met by the gate trigger timing generator circuitry shown, with power delivery to the load substantially independent of moderate variations in the magnetic properties of proper loads.

The variable resistor 85 connected between the left side of the capacitor 84 and the capacitor 83 provides a vernier adjustment on the variation of T2 with T1 to permit optimization of circuit performance by slightly varying the capacitor 84 discharge time constant. The diode 98 whose anode is connected to the capacitor 83 and whose cathode is connected through the resistor 91 to the left side of the capacitor 84 provides a more rapid charging path for the capacitor 84 during the time T1 when the output of the comparator 79 has gone low.

In the gate tripper timing generator circuit 34, the approximate relationship between T2 and T1 as set forth in equation (1) is maintained to produce substantially constant pan load power. It is, however, possible to vary the power a small amount, providing substantially constant power, by altering the circuit components which determine the "a" term in equation (1), such as to prevent undesirable current changes in the circuit components for different pan materials.

In a general sense, the circuitry implementations 34 of equation (1) provides a "fine" power control for pan loads of known types having particular inductance and effective loading characteristics when placed on a work coil. Depending upon the inverter components utilized, the circuit 34 may be modified to implement equation (1) for non-zero values of "b" and for values of "a" to maintain power to different pan loads substantially constant.

If the improper load check circuit 31 or the duty cycle generator puts a low on the line 96, trigger pulse generation is inhibited. When the improper load check circuit 31 output goes low this low is coupled through a diode 102 to the bias line 96. Or, alternatively, during a portion of the duty cycle when the inverter circuit is rendered inoperative, the duty cycle generator takes the line 96 low. In either event, when the inverter circuit is inoperative, the low on the bias line 96 is applied through the divider network of the resistors 92 and 93 to the inverting input of the comparator 79, making its output remain high. During this period of inactivity of the inverter circuit, the capacitor 83 does not discharge through the resistors 88 and 89 since the inverter output is high. So that the capacitor 83 will be in condition for subsequent inverter operation, the capacitor is provided a discharge path through a resistor 99 and a diode 101 to the now-low bias line 96.

In order to provide a pulse of sufficient amplitude to the noninverting input of the comparator 79 even in the event of a low DC supply voltage, and consequent low SCR voltage, a zero crossing sync generator voltage is developed across a resistor 103 and the positive pulses thereof coupled through a diode 104 to the comparator 79. The connection from the output of the comparator 79 to the zero crossing sync generator provides synchronization of the zero crossing pulses with the operation of the gate trigger timing generator 34.

I claim:

1. An induction heating apparatus having an inverter circuit including an induction heating coil coupled to a DC power supply for energizing the heating coil, the inverter circuit including a gate controlled rectifier for conducting current pulses of a first polarity through the heating coil, an oppositely poled diode coupled in parallel with the gate controlled rectifier for conducting current pulses of opposite polarity through the heating coil, a resistive-capacitive impedance connected in series with the diode which develops a voltage during conduction of the diode that is maintained for a time after conduction of the diode, means coupling said voltage to the gate of the gate controlled rectifier to provide gate reverse biasing for the rectifier during conduction of the diode and for said time after conduction.

2. The induction heating apparatus of claim 1 in which the resistive-capacitive impedance comprises a capacitor coupled in parallel with a resistor.

3. The induction heating apparatus of claim 2 in which there is a junction between the resistor-capacitor parallel combination and the anode of the diode, this junction being coupled to the gate of the gate controlled rectifier.

4. The induction heating apparatus of claim 3 in which there is a second resistor in series with the capacitor and this series combination is connected in parallel with said first resistor.

5. The induction heating apparatus of claim 3 in which said biasing voltage is coupled to the gate of the gate controlled rectifier through a transistor.

6. An induction heating apparatus having an inverter circuit including an induction heating coil coupled to a DC power supply for energizing the heating coil, the inverter circuit including a gate controlled rectifier for conducting current pulses of a first polarity through the heating coil, an oppositely poled diode coupled in parallel with the gate controlled rectifier for conducting current pulses of opposite polarity through the heating coil, an impedance having an at least partially reactive component connected in series with the diode which develops a voltage during conduction of the diode that is maintained for a time after conduction of the diode, means coupling said voltage to the gate of the gate controlled rectifier to provide gate reverse biasing for the rectifier during conduction of the diode and for said time after conduction.

7. An induction heating apparatus having an inverter circuit including an induction heating coil coupled to a DC power supply for energizing the heating coil, in which the DC power supply is unregulated and produces a varying voltage output having peaks and valleys, the inverter circuit includes a gate controlled thyristor cyclically gated to produce a conductive first period followed by a nonconductive second period in order to energize the heating coil, and a protection circuit for the inverter circuit comprising:

(a) circuit means coupled to the inverter for producing a signal having a positive excursion at a time t1 which is the start of said second period and a negative excursion at a time t2 which is the end of said second period, the magnitude of said excursions being related to the energy in the inverter at the respective times t1 and t2;

(b) a first peak charged capacitor connected to said circuit means for receiving energy therefrom over substantially the entire range of voltage variation of the DC power supply to produce a first output signal related to the energy in the inverter at time t1;

(c) a second peak charged capacitor connected to said circuit means for receiving energy therefrom over substantially the entire range of voltage variation of the DC power supply to produce a second output signal of opposite polarity to the first output signal and related to the energy in the inverter at time t2; and (d) means for taking a ratio of said first output signal and said second output signal and comparing the ratio to a reference to produce an inverter circuit protection signal as a result of said comparison if said ratio differs from the reference ratio by a predetermined amount.

8. The induction heating apparatus of claim 7 which further comprises (e) means for preventing the gating of the gate controlled thyristor in response to said inverter circuit protection signal.

9. The induction heating apparatus of claim 8 which further comprises (f) means for rechecking said ratio after the expiration of a period of time of non-gating of the gate controlled thyristor.

10. The induction heating apparatus of claim 7 further including (g) means activating said means (d) to make a comparison of said ratios near times at which the DC power supply is nearest to zero.

11. The induction heating apparatus of claim 10 in which said circuit means includes a snubber capacitor connected in series with a snubber resistor, with said series capacitor and resistor being coupled substantially in parallel with the gate controlled thyristor, the means (b) and (c) being connected to the junction between said snubber capacitor and said snubber resistor.

12. In an induction heating apparatus having an inverter circuit including an induction heating coil coupled to a DC power supply for energizing the heating coil, in which the DC power supply is unregulated and produces a varying voltage output having peaks and valleys, the inverter circuit includes a gate controlled thyristor cyclically gated to produce a conductive first period followed by a nonconductive second period in order to energize the heating coil, a protection circuit for the inverter circuit comprising:

(a) a snubber capacitor connected in series with a snubber resistor at a junction point, the series combination being connected in parallel with the gate controlled thyristor to comprise means for producing a signal having a positive excursion at a time t1 which is the start of said second period and a negative excursion at a time t2 which is the end of said second period, the magnitude of said excursions being related to the energy in the inverter at the respective times t1 and t2;

(b) means coupled to said junction for receiving energy therefrom over substantially the entire range of voltage variation of the DC power supply to produce a first voltage supply related to the energy in the inverter at time t1;

(c) means coupled to said junction for receiving energy therefrom over substantially the entire range of voltage variation of the DC power supply to produce a second voltage supply related to the energy in the inverter at time t1;

(d) means for taking a ratio of the first voltage supply and the second voltage supply;

(e) means for preventing gating of the gate controlled thyristor if said ratio deviates beyond a reference value.

13. In an induction heating apparatus having an inverter circuit, including an induction heating coil operable at operator selected power levels to be loaded by various metallic loads, coupled to a DC power supply for energizing the heating coil, in which the inverter circuit includes a gate controlled thyristor, a heating coil power control comprising:

(a) means at a given selected power level for producing a gating signal for the gate controlled thyristor after a period of time during which the inverter circuit has been nonconductive; and (b1) means for producing a signal representative of the length of conduction time of the inverter circuit; and (b2) means at said selected power level for adjusting the nonconduction time substantially inversely proportional to said signal so as to deliver substantially constant power to the various metallic loads for said selected power level.

14. The power control of claim 13 in which the means (b1) includes a capacitor coupled to the voltage developed across the thyristor during the nonconductive time of the inverter circuit, the voltage on the capacitor being determined dependent upon a reference signal voltage level at the beginning of the nonconduction period, with the discharge time of the capacitor setting the time at which the nonconductive period ends with the production of a gating pulse for the thyristor.

15. The power control of claim 13 in which the means (b2) controls said nonconduction time such that it equals a constant value minus a fraction of the conduction time.

16. The power control of claim 15 in which said fraction is between 0.3 and 0.5.

17. An induction heating apparatus having an inverter circuit including an induction heating coil coupled to a DC power supply for energizing the heating coil, the DC power supply being unregulated to produce a varying voltage output having peaks and valleys, the inverter circuit including a gate controlled thyristor cyclically gated to produce a conductive first period followed by a nonconductive second period in order to energize the heating coil at operator selected power settings, an oppositely poled diode coupled in parallel with the gate controlled thyristor, a resistive-capacitive impedance connected in series with the diode which develops a voltage during conduction of the diode that is maintained for a time after conduction of the diode has ceased, said voltage being coupled to the gate of the gate controlled thyristor to provide gate reverse biasing for the thyristor during conduction of the diode and for said time after conduction, comprising a protection circuit for the inverter circuit including:
  (a) circuit means coupled to the inverter for producing a signal having a positive excursion at a time t1 which is the start of said second period and a negative excursion at a time t2 which is the end of said second period, the magnitude of said excursions being related to the enrgy in the inverter at the respective times t1 and t2;
  (b) a first peak charged capacitor connected to said circuit means for receiving energy therefrom over substantially the entire range of voltage variation of the DC power supply to produce a first output signal related to the energy in the inverter at time t1;
  (c) a second peak charged capacitor connected to said circuit means for receiving energy therefrom over substantially the entire range of voltage variation of the DC power supply to produce a second output signal of opposite polarity to the first output signal and related to the energy in the inverter at time t2; and
  (d) means for taking a ratio of said first output signal and said second output signal and comparing the ratio to a reference to produce an inverter circuit protection signal as a result of said comparison if said ratio differs from the reference ratio by a predetermined amount; and
a heating coil power control including:
  (e) means for producing at a selected power setting a gating signal for the gate controlled thyristor after a period of time during which the inverter circuit has been nonconductive; and (f) means at said selected power setting for decreasing said nonconduction time when conduction time of the inverter circuit increases and for increasing said nonconduction time when the conduction time of the inverter circuit decreases thereby to maintain substantially constant power delivery at said selected power setting.

18. The induction heating apparatus of claim 17 which further comprises (g) means for rechecking said ratio of the means (d) after the expiration of a period of time of nongating of the gate controlled thyristor.

19. The induction heating apparatus of claim 18 in which the means (f) comprises:
  (f1) means for producing a signal representative of the length of conduction time of the inverter circuit; and
  (f2) means for setting the nonconduction time substantially inversely proportional to said voltage signal.

20. An induction heating apparatus having an inverter circuit including an induction heating coil coupled to a DC power supply for energizing the heating coil, the inverter circuit including a gate controlled thyristor cyclically gated to produce a conductive first period followed by a nonconductive second period in order to energize the heating coil at operator selected power settings, having timing and protection circuitry comprising:
  (a) an improper load detection means for detecting the absence of a proper metallic pan load coupled to the heating coil to interrupt the gating of the gate controlled thyristor;
  (b) gate trigger time means operative at a given power setting for decreasing said nonconduction time when the conduction time of the inverter circuit increases and for increasing said nonconduction time when the conduction time of the inverter circuit decreases with proper metallic pan loads, so that substantially constant power is coupled to a selected one of a plurality of proper metallic pan loads at the given power setting.

21. An induction heating apparatus having an inverter circuit including an induction heating coil coupled to a DC power supply for energizing the heating coil, in which the DC power supply is unregulated and produces a varying voltage output having peaks and valleys, the inverter circuit includes a gate controlled thyristor cyclically gated to produce a conductive first period followed by a nonconductive second period in order to energize the heating coil, and a protection circuit for the inverter circuit comprising:
  (a) first peak charged means connected to receive energy from the inverter over substantially the entire range of voltage variation of the DC power supply to produce a first output signal related to the energy in the inverter at a time t1 which is the start of said second period;
  (b) second peak charged means connected to receive energy from the inverter over substantially the entire range of voltage variation of the DC power supply to produce a second output signal related to the energy in the inverter at a time t2 which is the end of said second period; and
  (c) means for taking a ratio of said first output signal and said second output signal and comparing the ratio to a reference to produce an inverter circuit protection signal as a result of said comparison if said ratio differs from the reference ratio by a predetermined amount.

22. The induction heating apparatus of claim 21 which further comprises (d) means for preventing the gating of the gate controlled thyristor in response to said inverter circuit protection signal.

23. The induction heating apparatus of claim 22 which further comprises (e) means for rechecking said ratio after the expiration of a period of time of non-gating of the gate controlled thyristor.

24. The induction heating apparatus of claim 21 which further comprises (f) means for producing said inverter circuit protection signal for a period of time when power from the DC power supply is first applied to the inverter circuit.

25. The induction heating apparatus of claim 21 in which the DC power supply is derived from an AC power source and further comprising (g) means for producing a zero-crossing synchronization signal from the AC power source and (h) means for combining said synchronization signal with said comparison result before the means (c) referencing with said reference value, whereby the occurrence of said synchronization signal is necessary before an inverter circuit protection signal is produced.

26. In an induction heating apparatus having a loadable induction heating coil in an inverter circuit coupled to a DC power supply for energizing the heating coil at operator selected power settings, in which the inverter circuit includes a gate controlled thyristor, a heating coil power control comprising:
  (a) means operative at a selected power setting for producing a gating signal for the gate controlled thyristor after a period of time T2 during which the inverter circuit has been nonconductive; and (b) means operative at the selected power setting for varying said nonconduction time T2 in inverse proportion to conduction time T1 approximately according to the formula T2=aT1+b, where "b" is a non-zero constant and "a" is a negative constant, thereby to maintain power delivery substantially constant at the selected power setting.

27. The power control of claim 26 in which "a" is between −1 and 0 and "b" is greater than 20.

28. The power control of claim 26 in which the inverter circuit includes a commutating capacitor which charges from the DC supply and in which "a" is selected to end the nonconduction time T2 when the capacitor is appropriately charged, the charge on the commutating capacitor when the SCR is gated being indicative of the power supplied to the heating coil.

29. In an induction heating apparatus having an induction heating coil to which a variety of loads of different magnetic properties can be presented, the heating coil being connected in an inverter circuit coupled to a DC power supply for energizing the heating coil at a plurality of operator selected power settings, in which the inverter circuit includes a gate controlled thyristor, a heating coil power control comprising:

(a) means operative at a selected power setting for producing a gating signal for the gate controlled thyristor after a period of time T2 during which the inverter circuit has been nonconductive;

(a1) the inverter including means for responding to the gating signal for initiating a conductive cycle having a duration T1 dependent on the magnetic properties of the load presented to the induction heating coil; and (b) means operative at the selected power setting for adjusting said nonconduction time T2 dependent upon the conduction time T1 in such a way as to deliver power to each of said variety of loads at a level which is substantially independent of the magnetic properties of the loads.

30. The power control of claim 29 wherein said power level varies no more than 15% from a nominal value.

* * * * *

UNITED STATES PATENT AND TRADEMARK OFFICE
CERTIFICATE OF CORRECTION

PATENT NO. : 4,429,205

DATED : January 31, 1984

INVENTOR(S) : Karmen D. Cox

It is certified that error appears in the above-identified patent and that said Letters Patent is hereby corrected as shown below:

Column 11, line 8, change "increase" to -- decrease --.

Signed and Sealed this

Fifteenth Day of May 1984

[SEAL]

Attest:

GERALD J. MOSSINGHOFF

Attesting Officer     Commissioner of Patents and Trademarks